US012669133B2

(12) United States Patent
Van Der Lee

(10) Patent No.: US 12,669,133 B2
(45) Date of Patent: Jun. 30, 2026

(54) HOUSING FOR CENTRIFUGAL COMPRESSOR, CENTRIFUGAL COMPRESSOR, AND METHOD FOR PRODUCING A HOUSING FOR A CENTRIFUGAL COMPRESSOR

(71) Applicant: vdLee B.V., Medemblik (NL)

(72) Inventor: Jaap Jacobus Antonius Van Der Lee, Medemblik (NL)

(73) Assignee: vdLee B.V., Medemblik (NL)

( * ) Notice: Subject to any disclaimer, the term of this patent is extended or adjusted under 35 U.S.C. 154(b) by 0 days.

(21) Appl. No.: 19/227,574

(22) Filed: Jun. 4, 2025

(65) Prior Publication Data

US 2026/0055777 A1 Feb. 26, 2026

(30) Foreign Application Priority Data

Aug. 26, 2024 (NL) ..................................... 2038496

(51) Int. Cl.
*F04D 29/44* (2006.01)
*F04D 17/10* (2006.01)
(Continued)

(52) U.S. Cl.
CPC ........... *F04D 29/441* (2013.01); *F04D 17/10* (2013.01); *F04D 29/4233* (2013.01);
(Continued)

(58) Field of Classification Search
CPC .... F04D 29/441; F04D 17/10; F04D 29/4233; F04D 29/624; F05D 2230/10; F05D 2230/60
See application file for complete search history.

(56) References Cited

U.S. PATENT DOCUMENTS 4,770,605 A * 9/1988 Nakatomi ............. F04D 29/462 415/164
6,193,463 B1 * 2/2001 Adeff .................. F04D 29/4206 415/206
(Continued)

FOREIGN PATENT DOCUMENTS

CA 2578420 C 5/2010
CN 105275883 B 6/2019

OTHER PUBLICATIONS

Impro, "5-axis Machining for Aerospace Parts", May 10, 2024, Improprecision.com (Year: 2024).*
(Continued)

*Primary Examiner* — Andrew J Marien
(74) *Attorney, Agent, or Firm* — Rogowski Law LLC

(57) ABSTRACT

A housing 1 for a centrifugal compressor 40 with a centrifugal impeller 42 has a front cover 2. The front cover 2 defines a central axis 6 and has an axially oriented inlet 8, a diffuser 10 in fluid connection with the inlet 8, a collector 12 in fluid connection with the diffuser 10, and a rear cover opening which is opposite of the inlet 8 and designed to sealingly receive a rear cover 4. The diffuser has a first diffuser wall 30 and the collector has a collector wall 15. The front cover 2 is made of a three-dimensionally shaped base 22 and a separate disk-shaped diffuser wall part 24 which is attached to the three-dimensionally shaped base 22 for forming the diffuser 10 and the collector 12.

19 Claims, 4 Drawing Sheets

(51) Int. Cl.
*F04D 29/42* (2006.01)
*F04D 29/62* (2006.01)

(52) U.S. Cl.
CPC ........ *F04D 29/624* (2013.01); *F05D 2230/10* (2013.01); *F05D 2230/60* (2013.01)

(56) References Cited

U.S. PATENT DOCUMENTS

| | | | | |
|---|---|---|---|---|
| 8,419,359 | B2 * | 4/2013 | Cvjeticanin | B29C 45/14467 415/206 |
| 11,421,705 | B2 * | 8/2022 | Niwa | F04D 29/023 |
| 2007/0196206 | A1 * | 8/2007 | Martin | F04D 29/444 415/191 |
| 2010/0307151 | A1 * | 12/2010 | French | F04D 29/441 29/888.021 |
| 2011/0158796 | A1 | 6/2011 | Albrecht et al. | |
| 2012/0288367 | A1 * | 11/2012 | Boening | F01D 25/14 29/284 |
| 2013/0039750 | A1 * | 2/2013 | Osuka | F04D 29/023 29/888.024 |
| 2017/0306980 | A1 * | 10/2017 | Tsuji | F04D 29/624 |
| 2018/0283394 | A1 * | 10/2018 | Miyoshi | F04D 29/624 |
| 2019/0360500 | A1 | 11/2019 | Niwa | |
| 2020/0141259 | A1 * | 5/2020 | Inoue | F04D 29/4213 |
| 2020/0325902 | A1 * | 10/2020 | Isogai | F04D 17/10 |
| 2023/0272804 | A1 * | 8/2023 | Snell | F25B 25/005 415/203 |

OTHER PUBLICATIONS

Adhesives.org “Shrink & Pressing Fitting”, Nov. 1, 2023, Adhesives.org (Year: 2023).*

Frontier Metal Stamping “What is metal stamping? Here’s what you need to know”, Nov. 1, 2020, FrontierMetal.com (Year: 2020).*

Search Report and Written Opinion issued Mar. 5, 2025 for NL2038496.

* cited by examiner

HOUSING FOR CENTRIFUGAL COMPRESSOR, CENTRIFUGAL COMPRESSOR, AND METHOD FOR PRODUCING A HOUSING FOR A CENTRIFUGAL COMPRESSOR

BACKGROUND OF THE INVENTION

The invention relates to a housing for a centrifugal compressor, to a centrifugal compressor, and to a method for producing a housing for a centrifugal compressor.

A housing for a centrifugal compressor of this type is used to assemble a centrifugal compressor. A centrifugal compressor of this type is suitable to be connected to a driving mechanism such as a motor, or a turbine, to create, e.g., a stand-alone compressor, a supercharger, a gas turbine, a pipeline compressor, an air-condition or refrigeration unit, or a turbocharger. Such centrifugal processors are widely used for automotive engines, diesel engines, aircraft engines, in the oil and gas industry, for driving pneumatic tools, to manufacture gases, and other applications.

A housing for a centrifugal compressor of this type is known in practice. The components for the housing are made by machining, e.g., using a CNC milling machine. This has the advantage that a light-weight housing can be produced, which is advantageous for applications like airplanes and fast cars. Moreover, machining is economical for smaller series compared to moulding.

A disadvantage of the known housing for a centrifugal compressor is that it cannot be milled in one piece, because of undercut parts that cannot be reached by the milling tool. It is therefore assembled from a plurality of complex shaped components, which need to be welded together. This results in high production cost, and potentially vulnerable welds. Moreover, the welds need to be post-treated to make them smooth, and welds which are not sufficiently fluid-proof need to be treated with a sealant.

The invention aims to solve at least one of these problems, or at least to provide an alternative. In particular, the invention aims to provide a housing which is simpler to produce and thus less expensive.

SUMMARY OF THE INVENTION

A housing for a centrifugal compressor comprises a front cover and customarily a rear cover. The front cover defines a central axis and comprises an axially oriented inlet, a first diffuser wall of a diffuser, which diffuser is in fluid connection with the inlet, a collector wall of a collector, which collector is in fluid connection with the diffuser, an outlet in fluid connection with the collector, and a rear cover opening which is opposite of the inlet and designed to sealingly receive the rear cover. The rear cover comprises a second diffuser wall of the diffuser, which second diffuser wall faces the first diffuser wall after assembly of the rear cover in the rear cover opening. The front cover comprises a three-dimensionally shaped base and a separate diffuser wall part. The separate diffuser wall part is disk-shaped and comprises a diffuser side and a collector side opposite of the diffuser side and is attached to the three-dimensionally shaped base. The first diffuser wall comprises the diffuser side and the collector wall comprises the collector side.

By dividing the front cover into the three-dimensionally shaped base and the separate disk-shaped diffuser wall part, the contour of the collector in the three-dimensionally shaped base is sufficiently open to the surroundings for a milling cutter or other tool to mill the shape of the collector in the three-dimensionally shaped base. After completing the milling, both the diffuser and the collector obtain their final form by attaching the separate diffuser wall part. This separate diffuser wall part is a geometrically simple shape, as the complex parts of the front cover are all in the three-dimensionally shaped base. The complexity and thus cost of the production is relatively low, as only the three-dimensionally shaped base requires complex milling, while the separate diffuser wall part has a simple disk shape, which can be produced in an economical manner, and only two parts need to be attached to form the front cover.

"Attachment" or "attached" in the context of this specification is semi-permanent in the sense that the connection cannot be undone by regular use, but only using specific tools or techniques for disassembling.

In an embodiment, the separate diffuser wall part comprises an at least partly annular shape. The at least partly annular shape matches the form of a part of the three-dimensionally shaped base. This facilitates the attachment.

In an embodiment, the separate diffuser wall part comprises a full annular shape. This shape matches the form of the diffuser.

In an embodiment, the separate diffuser wall part is a substantially 2.5D object. This makes the separate diffuser wall part easy to produce, as it only requires a shaping operation in two dimensions.

In an embodiment, the separate diffuser wall part comprises a bevelled circumferential outer edge. Such an edge improves the fluid flow within the diffuser.

In an embodiment, the three-dimensionally shaped base comprises an annular groove, and an edge of the separate diffuser wall part is received in the annular groove for the attachment to the three-dimensionally shaped base. Attaching the separate diffuser wall part in a groove is a simple and reliable form of attachment.

In an embodiment, the housing for a centrifugal compressor further comprises a rear cover. The rear cover is sealingly attached to the front cover with connection means, i.e., fasteners such as nuts and bolts.

A centrifugal compressor comprises a housing according to any of the above definitions and further comprises a centrifugal impeller mounted in the housing for rotation about the central axis. In particular, a bearing of the centrifugal impeller is attached to the rear cover.

In an embodiment, a drive shaft of the centrifugal impeller is drivingly connected to a driving mechanism. In particular, the driving mechanism is chosen from a group consisting of a turbine for forming a turbocharger and a motor. Thanks to the inventive concept, the turbocharger is relatively lightweight and can be produced economically in relatively small series, which makes the turbocharger suitable for applications such as race cars and airplanes.

A method for producing a housing for a centrifugal compressor, in particular for producing a housing as defined above, comprises the following steps:

- providing a three-dimensionally shaped base for a front cover,
- providing a separate diffuser wall part, which is disk-shaped and comprises a diffuser side and a collector side opposite of the diffuser side, and
- attaching the separate diffuser wall part to the three-dimensionally shaped base for forming the front cover, which front cover defines a central axis and comprises an axially oriented inlet, a first diffuser wall of a diffuser, which diffuser is in fluid connection with the inlet, a collector wall of a collector, which collector is in fluid connection with the diffuser, an outlet in fluid connection with the collector, and a rear cover opening which is opposite of the inlet and designed to sealingly receive a rear cover. The rear cover comprises a second diffuser wall of the diffuser, which second diffuser wall faces the first diffuser wall after assembly of the rear cover in the rear cover opening. The attaching of the separate diffuser wall part to the three-dimensionally shaped base completes the first diffuser wall with the diffuser side of the diffuser wall part and completes the collector wall with the collector side of the separate diffuser wall part.

Providing the three-dimensionally shaped base and the separate diffuser wall part in separate steps enables (i) an optimal production of the three-dimensionally shaped base, (ii) a simple and thus cheap production of the disk-shaped separate diffuser wall part, and (iii) only one step of attaching these two parts in order to produce the front cover. This reduces cost relative to other methods wherein the front cover is divided into more than two parts in order to enable milling, and more than one of these parts requires expensive milling. Moreover, the method set forth herein reduces the weight of the front cover compared to molded front covers and enables more economic production of smaller series compared to molded production of front covers.

In an embodiment, the step of providing a three-dimensionally shaped base for a front cover comprises machining, in particular milling, the three-dimensionally shaped base out of a piece of raw material. Machining enables precise and thin-walled production. In particular, the milling is performed with a 5-axis milling machine.

In an embodiment, the step of attaching the separate diffuser wall part to the three-dimensionally shaped base comprises a step of shrink-fitting the separate diffuser wall part and the three-dimensionally shaped base. Shrink-fitting is a relatively simple and thus economical attachment method step which results in a strong and sufficient fluid tight connection, which does not require post-processing or a sealant. Typically, the resulting connection will be by friction fit, also called interference fit. In a variant, a small undercut is provided in one of the attachment areas, so that a form-fit connection results.

In particular, the step of shrink-fitting comprises heating one of the separate diffuser wall part or the three-dimensionally shaped base, and/or cooling the other one of the separate diffuser wall part or the three-dimensionally shaped base, followed by positioning the separate diffuser wall part at the three-dimensionally shaped base, and cooling down the heated one of the separate diffuser wall part or the three-dimensionally shaped base, and/or allowing the cooled one of the separate diffuser wall part or the three-dimensionally shaped base to warm up, until a friction and/or form-fit connection results.

More in particular, the step of shrink-fitting comprises heat expansion of the separate diffuser wall part relative to the three-dimensionally shaped base.

In an embodiment, the method comprises the step of sealingly attaching a rear cover to the rear cover opening.

In an embodiment, the step of providing the separate diffuser wall part comprises turning, cutting, or milling the separate diffuser wall part out of a sheet material. In particular, the cutting is performed with a laser cutter or a waterjet cutter. In particular, the milling is performed with a 3-axis milling machine. These are all cost effective, yet very precise, production methods compared to 5-axis milling, resulting in a relatively cheap, and still highly functional, diffuser wall part.

In an embodiment, the method comprises the step of providing a centrifugal impeller inside the housing for forming a centrifugal compressor. In particular, a bearing of the centrifugal impeller is attached to the rear cover.

DESCRIPTION OF THE DRAWINGS

The invention, its effects, and advantages will be explained in more detail on the basis of the schematic drawings, in which.

DETAILED DESCRIPTION

Figure 4:
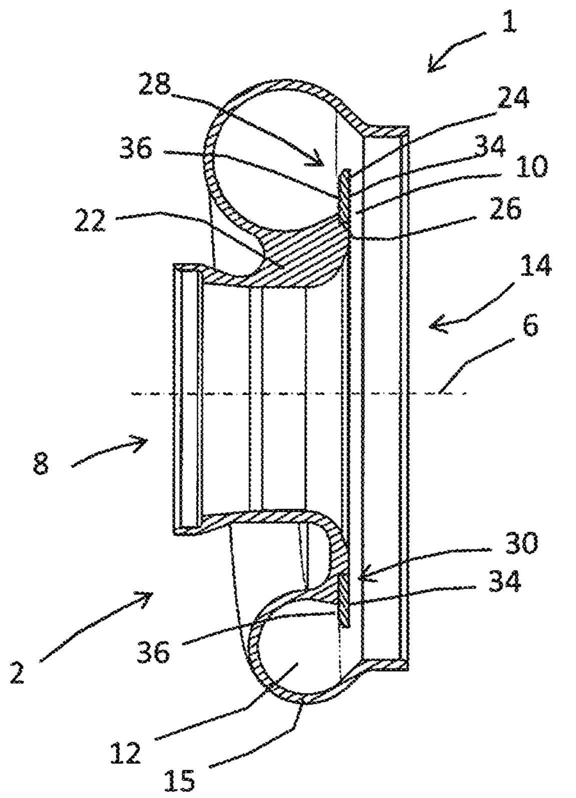
FIG. 4 shows a cross-sectional view through the front cover with diffuser wall of FIG. 3.
Figure 6:
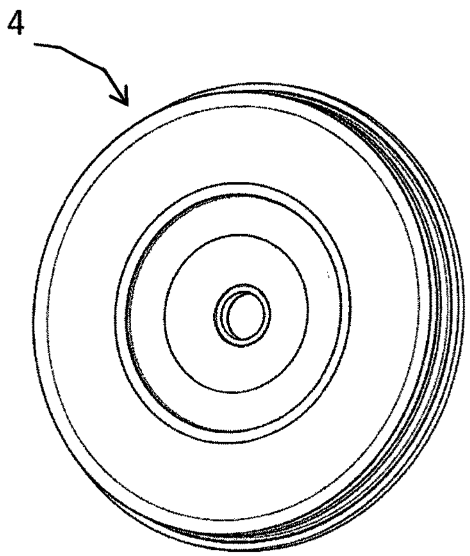
FIG. 6 shows a perspective view of an inner side of a rear cover for a housing for a centrifugal compressor.
Figure 7:
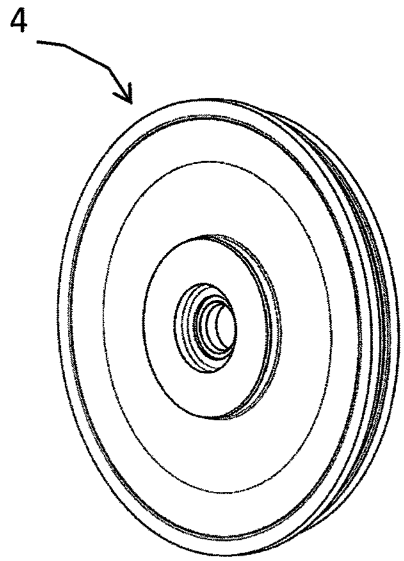
FIG. 7 shows a perspective view of an outside of the rear cover of FIG. 6.
Figure 8:
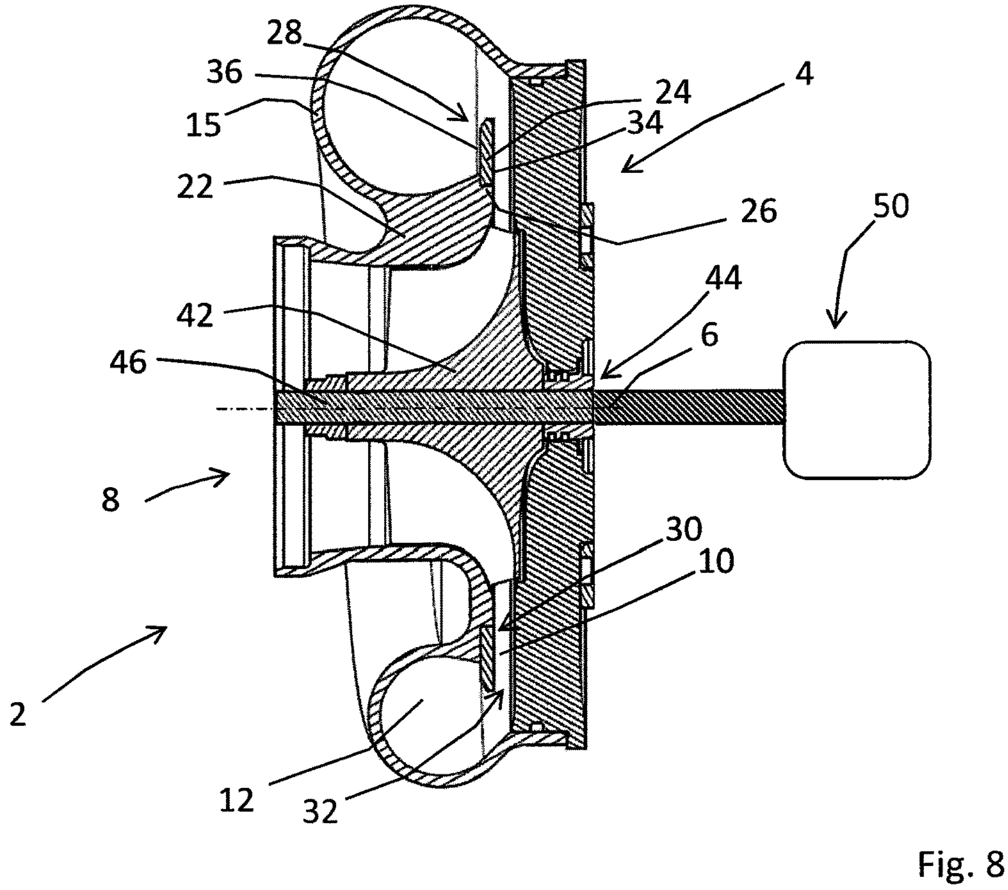
FIG. 8 shows a cross-sectional view through a centrifugal compressor.

The figures show a housing for a centrifugal compressor according to the invention, which is denoted in its entirety by reference number 1. The housing 1 is made of a front cover 2 and a rear cover 4 (see FIGS. 1 and 6-8). The front cover 2 defines a central axis 6 and has an axially oriented inlet 8, a diffuser 10, a collector 12, an outlet 13, and a rear cover opening 14. The diffuser 10 is in fluid connection with the inlet 8. The collector 12 has the shape of a volute, defined by a collector wall 15, and is in fluid connection with the diffuser 10. The outlet 13 is in fluid connection with the collector 12. The rear cover opening 14 is positioned at a side opposite of the side of the inlet 8. (see FIG. 4). The rear cover opening 14 is designed to sealingly receive the rear cover 4, as shown in FIG. 8. The rear cover 4 is sealingly attached to the front cover 2 with connection means (not shown), such as with fasteners, for example, a bolt and nut connection through holes (not shown) in the rear cover 4 and the front cover 2.

Figure 1:
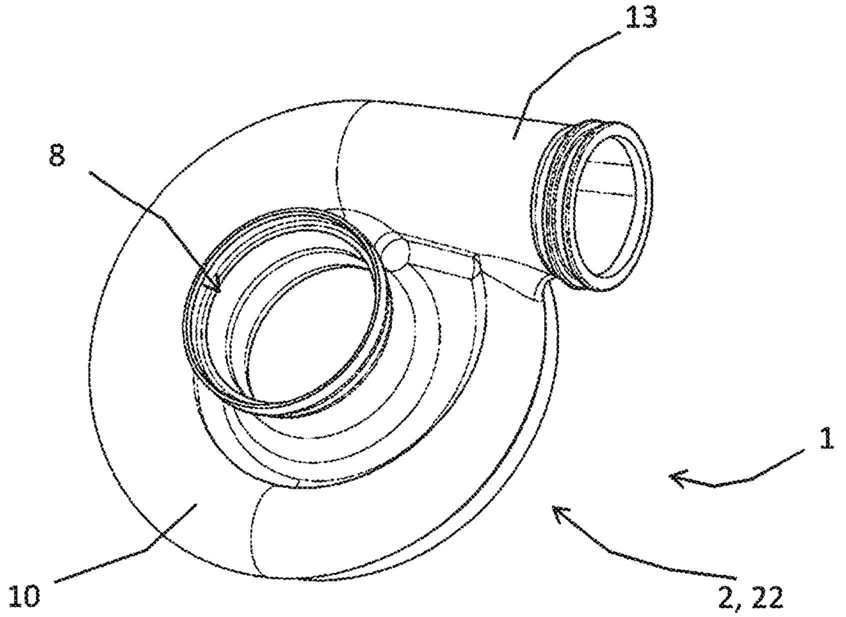
FIG. 1 shows a perspective front view of a front cover for a housing for a centrifugal compressor.
Figure 2:
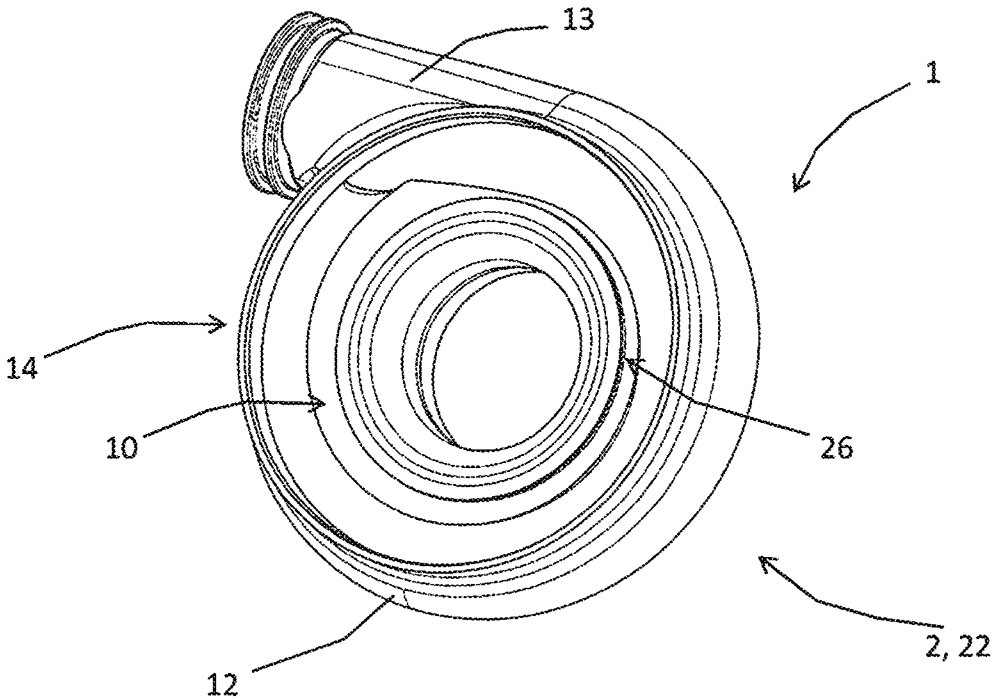
FIG. 2 shows a perspective rear view of the front cover of FIG. 1 without a diffuser wall.
Figure 3:
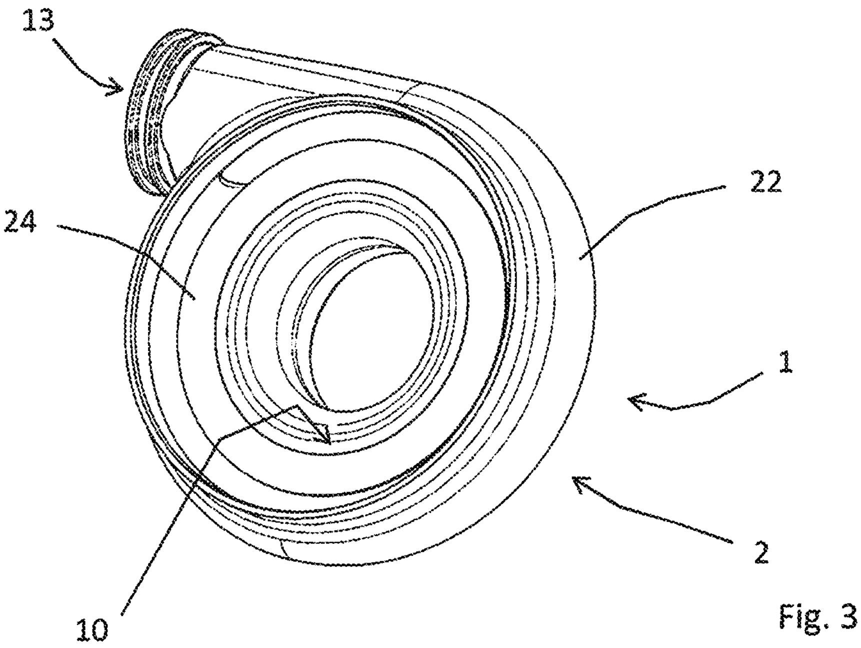
FIG. 3 shows a perspective rear view of the front cover of FIG. 1 with a diffuser wall.
Figure 5:
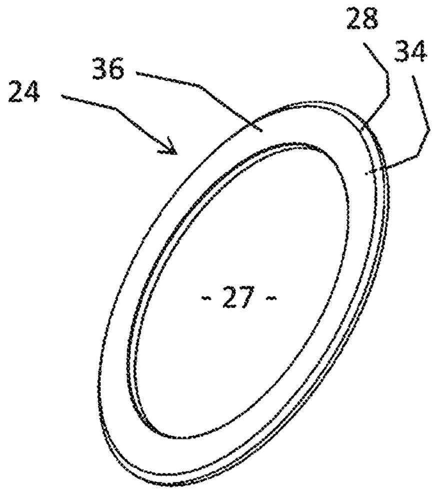
FIG. 5 shows a perspective rear view of the diffuser wall of FIG. 3.

The front cover 2 is made of a three-dimensionally shaped base 22 and a separate diffuser wall part, in this embodiment a diffuser plate 24. (See FIGS. 3, 4, and 5). The diffuser plate 24 is attached to the three-dimensionally shaped base 22 such that they jointly form the collector 12 and part of the diffuser 10. The attachment of this embodiment is done by means of shrink-fitting, wherein the diffuser plate 24 is received in an annular groove 26 which is provided in the three-dimensionally shaped base 22 at the diffuser 10, as will be explained below in more detail. The resulting attachment is semi-permanent in the sense that it cannot be undone by regular use. To destroy the attachment, either specific tools would be required to separate the diffuser plate 24 from the three-dimensionally shaped base 22, or at least one part would be heated or cooled to undo the shrink-fit.

The diffuser plate 24 is disk-shaped and a circumference of an inner opening 27 of the disk-shaped diffuser plate 24 corresponds to the annular groove 26. In this embodiment, the diffuser plate 24 has a bevelled circumferential outer edge 28. Such an edge improves the fluid flow within the diffuser 10.

The diffuser 10 is delimited by a first diffuser wall 30 and a second diffuser wall 32. The first diffuser wall 30 is comprised by the front cover 2, and the second diffuser wall is comprised by the rear cover 4. The second diffuser wall 32 faces the first diffuser wall 30 after assembly of the rear cover 4 in the rear cover opening 14, as shown in FIG. 8.

The diffuser wall part 24 comprises a diffuser side 34 and a collector side 36 opposite of the diffuser side. The first diffuser wall 30 comprises the diffuser side 34 of the diffuser wall part 24 and the collector wall 15 comprises the collector side 36 of the diffuser wall part 24.

In the shown embodiment, the diffuser plate 24 is provided within the three-dimensionally shaped base 22 so as to face the rear cover opening 14. The pressure difference in use over the diffuser plate 24 is in this position low compared to other positions, such as a position wherein the separate diffuser wall part would form part of the outside wall of the housing.

FIG. 8 shows a centrifugal compressor 40 with a housing according to the invention, such as the housing 1 of FIGS. 1-4. The centrifugal compressor 40 has a centrifugal impeller 42 mounted in the housing for rotation about the central axis 6. A bearing 44 for a drive shaft 46 of the centrifugal impeller 42 is in this embodiment attached to the rear cover 4. The drive shaft 46 is drivingly connected to a driving mechanism 50, such as a motor or a turbine, for driving the centrifugal impeller 42.

Figure 9:
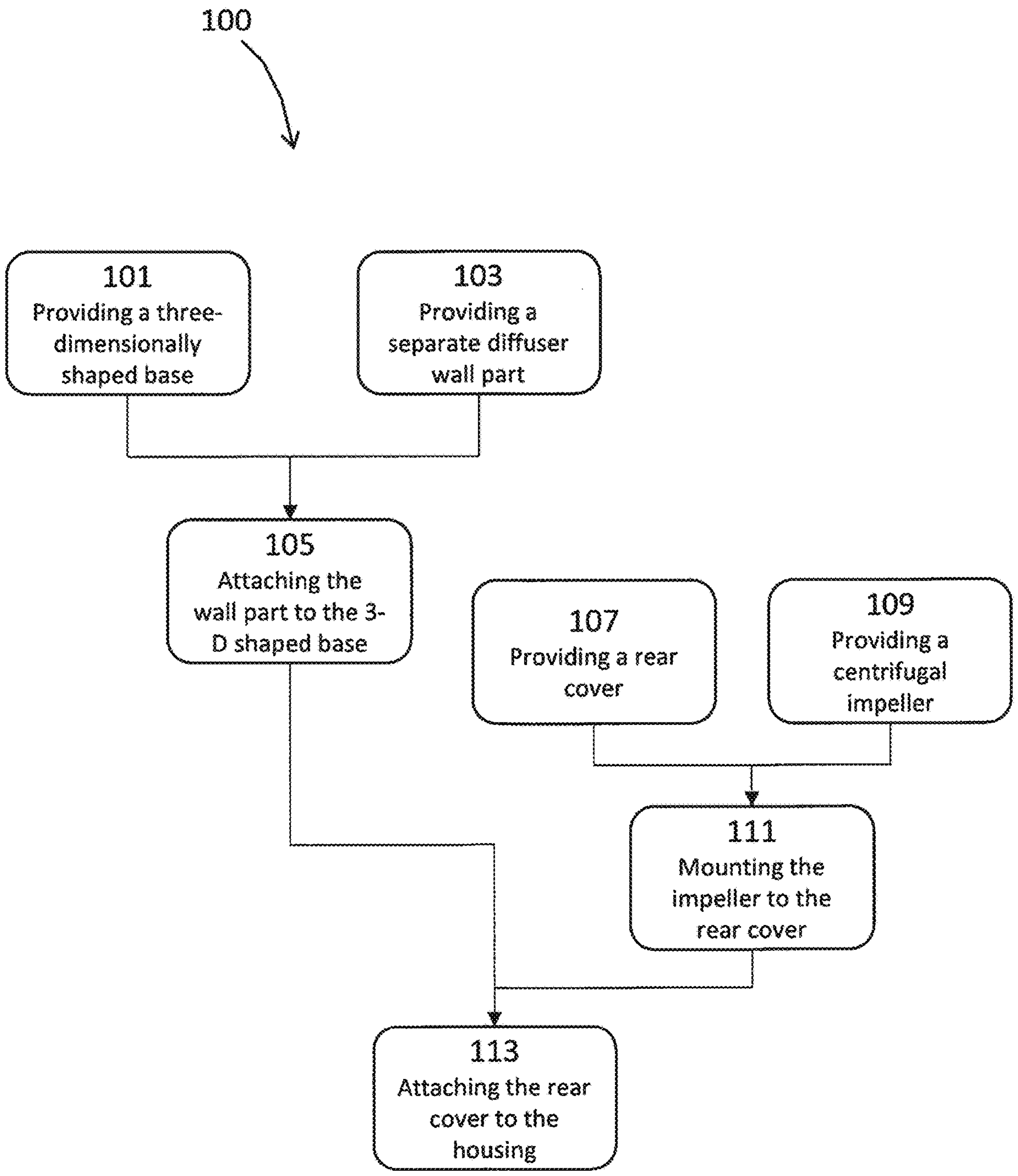
FIG. 9 shows a flow diagram of method for producing a housing for a centrifugal compressor.

A method 100 for producing a housing for a centrifugal compressor, in particular for producing a housing as described above, is illustrated in FIG. 9. The method comprises the following steps:

At step 101 a three-dimensionally shaped base for a front cover, such as the front cover which is described above, is provided.

At step 103, a separate diffuser wall part, such as the diffuser plate as described above, is provided.

At step 105, the separate diffuser wall part is attached to the three-dimensionally shaped base.

Providing the three-dimensionally shaped base and the separate diffuser wall part in different steps, enables an optimal production of the three-dimensionally shaped base. In particular, this enables step 101 to comprise the milling with a 5-axis milling machine of the three-dimensionally shaped base out of one piece of base material by inserting a milling tool through an opening which is available, because the separate diffuser wall part is not present yet and thus does not block the required full access of the collector. Milling enables precise and thin-walled production resulting in a high quality and lightweight part. The separate diffuser wall part only needs to complete the collector and the diffuser and can thus be of a simple shape.

In this embodiment of the method, the step 105 of attaching the separate diffuser wall part to the three-dimensionally shaped base comprises a step of shrink-fitting the separate diffuser wall part and the three-dimensionally shaped base. In particular, the step of shrink-fitting comprises thermal expansion and/or thermal contraction. The separate diffuser wall part is thermally expanded relative to the three-dimensionally shaped base and/or the three-dimensionally shaped base is thermally contracted. This step includes the heating of the separate diffuser wall part and/or the cooling of the three-dimensionally shaped base. This is followed by a step of positioning the separate diffuser wall part at the three-dimensionally shaped base, and cooling down the heated one of the separate diffuser wall part and the three-dimensionally shaped base, and/or allowing the cooled one of the separate diffuser wall part and the three-dimensionally shaped base to warm up, until a friction and/or form-fit connection results.

In this embodiment of the method, the method comprises a step 107 of providing a rear cover.

In this embodiment, the method comprises a step 109 of providing a centrifugal impeller.

In this embodiment, the method comprises a step 111 of mounting the centrifugal impeller to the rear cover by attaching a bearing of the centrifugal impeller to the rear cover.

In this embodiment, the method comprises a step 113 of attaching the rear cover with the centrifugal impeller to the housing, which results in forming a centrifugal compressor.

The method of this embodiment results in a relative lightweight compressor housing thanks to the milling of the three-dimensionally shaped base. The complexity and thus cost of the production is relatively low, as only the three-dimensionally shaped base requires complex milling, while the separate diffuser wall part is of a relatively simple shape. In particular, the diffuser wall part is produced by turning, cutting, or 3-axis milling the separate diffuser wall part out of a sheet material. This results in the cost of producing the diffuser wall part of being approximately ten times lower than in the case of existing front covers wherein the second and often even third part of the front cover are also made by 5-axis milling. In the inventive method, only two parts need to be attached to complete the required shape of the collector and the diffuser and to form the front cover, which contributes to the relative low cost of production.

Several variants are possible within the scope of the attached claims. The features of the above-described preferred embodiment(s) may be replaced by any other feature within the scope of the attached claims, such as the features described in other embodiments, and in the following paragraphs. Product features claimed or described in relation to the method are part of an embodiment of the housing or centrifugal compressor, while method features which are claimed or described in relation to the housing or centrifugal compressor are part of an embodiment of the method.

One, more, or all parts of the housing and centrifugal impeller are preferably made of a metal, such as an aluminium alloy or a stainless steel. In a variant, at least one of the parts of the housing and/or the centrifugal impeller is made of a plastic.

In an embodiment, the three-dimensionally shaped base is produced at least partly by another type of machining, such as sawing, shaping, grinding, plasma beam machining, waterjet machining, and electrical discharge machining.

In an embodiment, the front cover consists of the three-dimensionally shaped base and the separate diffuser wall part.

In an embodiment, a drive shaft of the centrifugal impeller is drivingly connected to a turbine shaft for forming a turbocharger. Thanks to the inventive concept, the turbocharger is relatively lightweight and can be produced economically in relatively small series, which makes the turbocharger suitable for applications such as race cars and airplanes.

In an embodiment, the rear cover is part of another structure, such as the housing of a turbine or of a motor, such as an electric or combustion motor.

In an embodiment, a disk-shaped diffuser plate is a thin, flat, and circular plate.

In an embodiment, the disk-shaped diffuser plate is not provided with a bevelled circumferential edge for further reducing the production cost.

While the above-described disk-shaped diffuser plate has a constant thickness, except for the bevelled circumferential edge, in another embodiment the disk-shaped diffuser plate has a variable thickness, such as a thickness which reduces from an inner part of the disk-shaped diffuser plate towards its outer edge.

While the above-described annular groove of the three-dimensionally shaped base is half open, in that it has one radially extending groove wall, in another embodiment the annular groove has two radially extending groove walls. The radially extending groove wall which is facing the rear cover opening is preferably so low that it enables the shrink-fitting of separate diffuser wall part. In particular, a central opening of the disk-shaped diffuser plate, is wide enough after the thermal expansion of the separate diffuser wall part, and/or after the thermal contraction of the three-dimensionally shaped base, to be moved in axial direction over the relevant radially extending groove wall. After the separate diffuser wall part and the three-dimensionally shaped base regain their original dimensions, the radially extending groove wall provides a form-fit connection with an edge of the central opening of the separate diffuser wall part.

In an embodiment, the shrink-fit comprises the thermal contraction of the separate diffuser wall part, and/or the thermal expansion of the three-dimensionally shaped base. In such an embodiment, the separate diffuser wall part comprises a axially extending and radially outward facing wall for abutting a radially inward facing wall of the three-dimensionally shaped base. In an embodiment, the axially extending and radially outward facing wall is a circumferential outer edge of the separate diffuser wall part. In a variant, the axially extending and radially outward facing wall is a on a radially extending surface of the separate diffuser wall part.

The invention claimed is:

1. A housing for a centrifugal compressor, comprising:

a front cover, and a separate diffuser wall part which is disk-shaped and comprises a diffuser side and a collector side opposite of the diffuser side, wherein the front cover defines a central axis and comprises an axially oriented inlet, a first diffuser wall of a diffuser, wherein the diffuser is in fluid connection with the inlet, a collector wall of a collector, which wherein the collector is in fluid connection with the diffuser, an outlet in fluid connection with the collector, and a rear cover opening which is opposite of the inlet and designed to sealingly receive a rear cover, wherein the rear cover comprises a second diffuser wall of the diffuser, and wherein the second diffuser wall faces the first diffuser wall after assembly of the rear cover in the rear cover opening, and wherein the front cover comprises a three-dimensionally shaped base that has a groove and the separate diffuser wall part, and wherein the separate diffuser wall part has an inner opening with a circumference that corresponds to the groove of the three-dimensionally shaped base and wherein the inner opening of the separate diffuser wall part is received in the groove and is attached by shrink-fit to the three-dimensionally shaped base, and the first diffuser wall comprises the diffuser side of the separate diffuser wall part and the collector wall comprises the collector side of the separate diffuser wall part.

2. The housing for the centrifugal compressor according to claim 1, wherein the separate diffuser wall part comprises a bevelled circumferential outer edge.

3. The housing for the centrifugal compressor according to claim 1, wherein the groove of the three-dimensionally shaped base comprises an annular groove.

4. The housing for the centrifugal compressor according to claim 1, wherein the rear cover is sealingly attached to the front cover.

5. The centrifugal compressor, comprising:

the housing according to claim 1, and a centrifugal impeller mounted in the housing for rotation about the central axis of the front cover of the housing.

6. The centrifugal compressor according to claim 5, wherein a drive shaft of the centrifugal impeller is drivingly connected to a driving mechanism.

7. The centrifugal compressor according to claim 6, wherein the driving mechanism is chosen from the group consisting of: a turbine for forming a turbocharger and a motor.

8. The centrifugal compressor according to claim 5, wherein the separate diffuser wall part is attached to the three-dimensionally shaped base with the shrink-fit by heat expansion of the separate diffuser wall part followed by cooling.

9. The centrifugal compressor according to claim 8, wherein a drive shaft of the centrifugal impeller is drivingly connected to a driving mechanism.

10. The housing for the centrifugal compressor according to claim 1, wherein the separate diffuser wall part is attached to the three-dimensionally shaped base with the shrink-fit by heat expansion of the separate diffuser wall part followed by cooling.

11. The housing for the centrifugal compressor according to claim 1, the disk-shaped diffuser plate comprises a central opening with an edge, the groove has two radially extending groove walls, the radially extending groove wall which is facing the rear cover opening is so low that it enables the shrink-fitting of the separate diffuser wall part by moving the central opening of the disk-shaped diffuser plate in axial direction over the radially extending groove wall which is facing the rear cover opening, and the radially extending groove wall which is facing the rear cover opening provides a form-fit connection with the edge of the central opening of the disk-shaped diffuser plate after the separate diffuser wall part and the three-dimensionally shaped base regain their original dimensions.

12. A method for producing a housing for a centrifugal compressor, comprising the following steps:

providing a three-dimensionally shaped base for a front cover, providing a separate diffuser wall part, which is disk-shaped and comprises a diffuser side and a collector side opposite of the diffuser side, and shrink-fitting the separate diffuser wall part to the three-dimensionally shaped base for forming the front cover, wherein the front cover defines a central axis and comprises an axially oriented inlet, a first diffuser wall of a diffuser, wherein the diffuser is in fluid connection with the inlet, a collector wall of a collector, wherein the collector is in fluid connection with the diffuser, an outlet in fluid connection with the collector, and a rear cover opening which is opposite of the inlet and designed to sealingly receive a rear cover, wherein the rear cover comprises a second diffuser wall of the diffuser, wherein the second diffuser wall faces the first diffuser wall after assembly of the rear cover in the rear cover opening, and wherein the attaching of the separate diffuser wall part to the three-dimensionally shaped base completes the first diffuser wall with the diffuser side of the diffuser wall part and completes the collector wall with the collector side of the separate diffuser wall part.

13. The method according to claim 8, wherein the step of providing the three-dimensionally shaped base for the front cover comprises machining the three-dimensionally shaped base out of a piece of raw material.

14. The method according to claim 13, wherein the step of providing the three-dimensionally shaped base for the front cover comprises milling the three-dimensionally shaped base out of the piece of raw material with a 5-axis milling machine.

15. The method according to claim 12, further comprising the step of sealingly attaching the rear cover to the rear cover opening.

16. The method according to claim 12, wherein the step of providing the separate diffuser wall part comprises turning, cutting, or milling the separate diffuser wall part out of a sheet material.

17. The method of claim 12, wherein the separate diffuser wall part has an edge, and the separate diffuser wall part is attached to the three-dimensionally shaped base by seating the edge of the separate diffuser wall part into a groove formed in the front cover and the shrink-fitting by heat expansion followed by cooling.

18. The method of claim 17, wherein the groove of the three-dimensionally shaped base comprises an annular groove.

19. The method of claim 12, wherein the three-dimensionally shaped base has a groove and the separate diffuser wall part has an inner opening with a circumference that corresponds to the groove of the three-dimensionally shaped base, and wherein the inner opening of the separate diffuser wall part is received in the groove and is attached by the shrink-fit to the three-dimensionally shaped base.

* * * * *